(No Model.)
J. H. POAGE.
HAY GATHERER.
No. 322,639. Patented July 21, 1885.
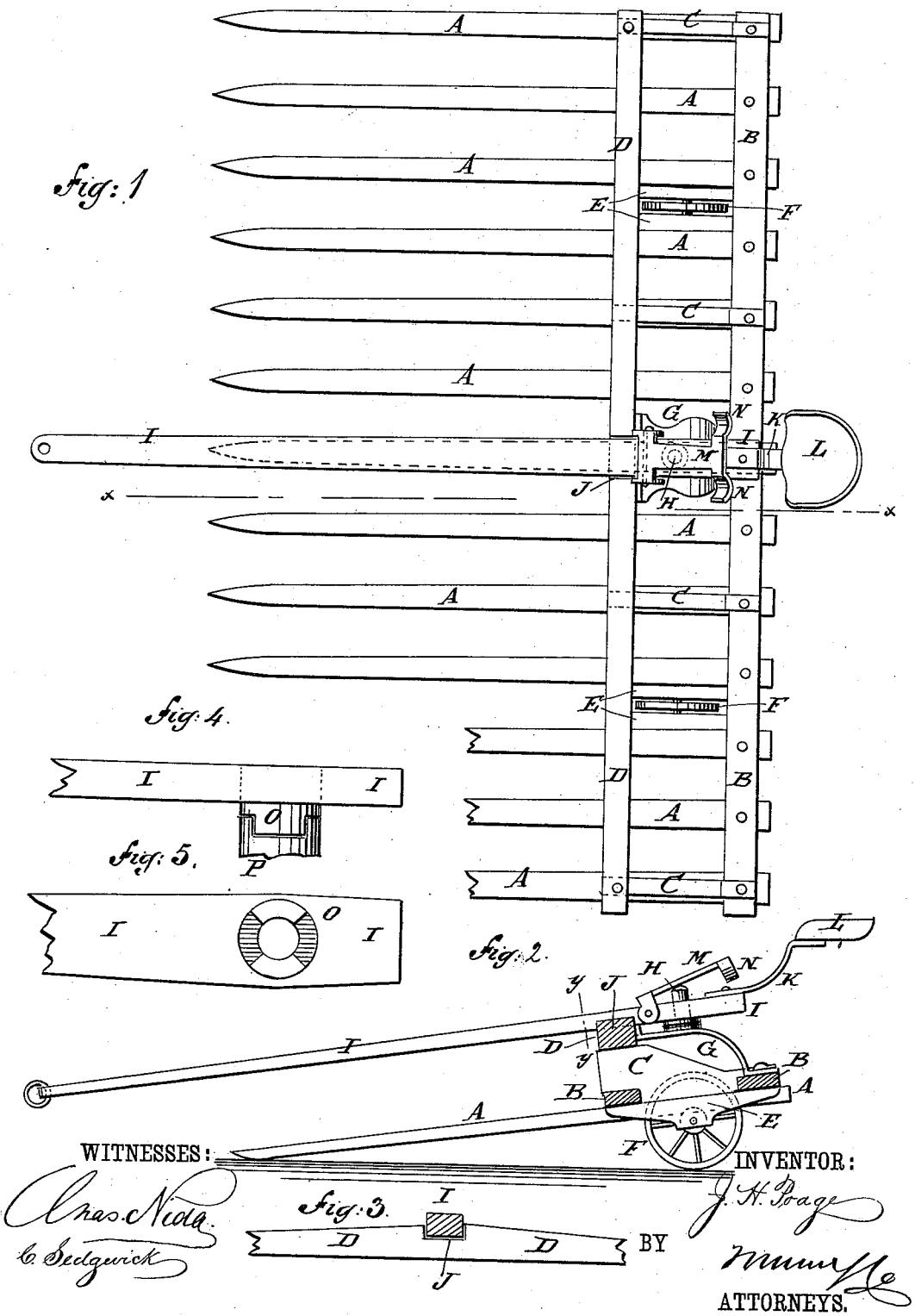

United States Patent Office.

JAMES H. POAGE, OF MONROE, MO., ASSIGNOR OF ONE-HALF TO GEORGE W. DURRANT AND WILLIAM R. P. JACKSON, BOTH OF SAME PLACE.

HAY-GATHERER.

SPECIFICATION forming part of Letters Patent No. 322,639, dated July 21, 1885.

Application filed September 3, 1884. (No model.)

*To all whom it may concern:*

Be it known that I, JAMES H. POAGE, of Monroe, in the county of Monroe and State of Missouri, have invented a new and useful Improvement in Hay-Gatherers, of which the following is a full, clear, and exact description.

Reference is to be had to the accompanying drawings, forming a part of this specification, in which similar letters of reference indicate corresponding parts in all the figures.

Figure 1 is a plan view of one of my improved hay-gatherers, part being broken away. Fig. 2 is a sectional side elevation of the same, taken through the line $x\,x$, Fig. 1. Fig. 3 is a sectional front elevation of a part of the same, taken through the line $y\,y$, Fig. 2. Fig. 4 is a side elevation of the tongue and a clutch for connecting the tongue with the rake. Fig. 5 is an under side view of the tongue and the part of the clutch attached thereto.

The object of this invention is to provide hay-gatherers constructed in such a manner that the tongue and team can be turned and the gatherer drawn back from beneath the collected hay without its being necessary to back or detach the team.

The invention consists in a hay-gatherer constructed with teeth connected by cross-bars and provided with a reversible tongue. The tongue is connected with the rake by a bracket and pin, so that the said tongue can be readily turned into a reversed position. The reversible tongue is provided with a clutch so arranged as to lock the tongue in place when parallel with the rake-teeth in either a direct or reversed position. The reversible tongue is provided with a foot-lever resting on the pivoting-pin, whereby the said tongue can be readily thrown out of gear, as will be hereinafter fully described.

A represents the teeth, which are attached at their rear ends, and at a little distance from their rear ends to two cross-bars, B.

To the cross-bars B are attached brackets C, to the tops of which, and directly over the front cross-bar, B, is attached a cross-bar, D, to prevent the collected hay from sliding off the rear side of the rake.

To the lower sides of the cross-bars B are attached bearings E, to which are journaled small wheels F to hold the rear side of the rake raised, so that the teeth A will pass beneath the hay more readily, and the friction between the gatherer and the ground will be lessened.

To the middle parts of the rear cross-bar, B, and the top cross-bar, D, is attached a metallic bracket, G, to which, a little in the rear of the top cross-bar, D, is attached a pin, H, which passes through a hole in the tongue I at a little distance from the rear end of the said tongue. The tongue I is made a little longer than the teeth A, so that the draft can be readily applied to the forward end of the said tongue.

In the upper side of the top cross-bar, D, is formed a recess, J, to receive the tongue I, and serve as a clutch to hold the said tongue from turning on the pin H.

To the rear end of the tongue I is attached the lower end of a standard, K, to the upper end of which is attached the driver's seat L. To the tongue I, a little in front of the bearing for the pin H, is hinged the forward end of a lever, M, which rests upon the projecting upper end of the pin H, and has foot-rests N formed upon or attached to its rear end. With this construction, when a load of hay has been collected and drawn to the desired place the driver throws his weight upon the rear end of the foot-lever M, which raises the tongue I out of the clutch-recess J, and allows the said tongue to turn with the team through a half-revolution, when the rear end of the said tongue drops into the clutch J, and the gatherer can be drawn out from beneath the load of collected hay.

The lever M can be so formed as to be operated by hand.

If desired, the upper side of the top bar, D, can be made smooth, and a two-toothed clutch-block, O, attached to the lower side of the tongue I, to engage with a similar clutch-block, P, attached to the bracket G, the two blocks O P being perforated for the passage of the pivoting-pin H.

The teeth of the clutch O P are each made of the size of a quarter of a circle, as shown in Fig. 5, so that the clutch-blocks can engage with each other in only two positions, and the said clutch-blocks are so arranged as to engage only when the tongue I is parallel with the teeth of the gatherer.

Other arrangements can be used for connecting the tongue with the gatherer; but I prefer the one first described as being simple in construction and reliable in operation.

It will be observed that the driver's seat L, being rigidly connected with the tongue I, the driver will always face the team in whatever position the said tongue and team may be.

Having thus described my invention, I claim as new and desire to secure by Letters Patent—

1. In a hay-gatherer the combination, with the rake and its supporting-frame and pivoted tongue also clutched to said frame, of a lever pivoted to said tongue and resting upon an upward extension of the tongue-pivot, substantially as and for the purpose set forth.

2. In a hay-gatherer, the combination, with the rakes A B C D, the bracket and pin G H, and the reversible tongue I and its clutch, of the foot-lever M, substantially as herein shown and described, whereby the said tongue can be readily thrown out of gear, as set forth.

JAMES H. POAGE.

Witnesses:
R. B. BRISTOW,
W. M. WATSON.